United States Patent
Naderer

(10) Patent No.: US 11,260,537 B2
(45) Date of Patent: Mar. 1, 2022

(54) MACHINE TOOL FOR ROBOT-ASSISTED SURFACE FINISHING

(71) Applicant: FerRobotics Compliant Robot Technology GmbH, Linz (AT)

(72) Inventor: Ronald Naderer, Oberneukirchen (AT)

(73) Assignee: FERROBOTICS COMPLIANT ROBOT TECHNOLOGY GMBH, Linz (AT)

( * ) Notice: Subject to any disclaimer, the term of this patent is extended or adjusted under 35 U.S.C. 154(b) by 276 days.

(21) Appl. No.: 16/336,410

(22) PCT Filed: Sep. 26, 2017

(86) PCT No.: PCT/EP2017/074327
§ 371 (c)(1),
(2) Date: Mar. 25, 2019

(87) PCT Pub. No.: WO2018/055189
PCT Pub. Date: Mar. 29, 2018

(65) Prior Publication Data
US 2019/0232502 A1 Aug. 1, 2019

(30) Foreign Application Priority Data
Sep. 26, 2016 (DE) .......................... 102016118173.0

(51) Int. Cl.
*B25J 11/00* (2006.01)
*B24B 27/00* (2006.01)
*B24B 41/00* (2006.01)

(52) U.S. Cl.
CPC ....... *B25J 11/0065* (2013.01); *B24B 27/0038* (2013.01); *B24B 41/002* (2013.01)

(58) Field of Classification Search
CPC ..... B25J 11/00; B25J 11/0065; B25J 11/0055; B25J 11/005; B25J 17/02; B25J 17/0225;
(Continued)

(56) References Cited

U.S. PATENT DOCUMENTS

| 5,569,060 A | * | 10/1996 | Mori | ....................... B21B 28/04 |
| | | | | 451/425 |
| 2003/0181145 A1 | * | 9/2003 | Collins | ................... B24B 9/107 |
| | | | | 451/41 |

(Continued)

FOREIGN PATENT DOCUMENTS

| CN | 105196296 A | 12/2015 |
| DE | 102011006679 A1 | 9/2012 |

(Continued)

*Primary Examiner* — Orlando E Aviles
*Assistant Examiner* — Alberto Saenz
(74) *Attorney, Agent, or Firm* — Murphy, Bilak & Homiller, PLLC

(57) ABSTRACT

The invention relates to a machine tool for robot-assisted surface finishing. According to one embodiment, the machine tool comprises a first support plate and a second support plate. The first support plate is designed for mounting on a manipulator. An output shaft for receiving a rotatable tool is mounted on the second support plate. The machine tool additionally comprises a linear actuator that acts between the first support plate and the second support plate, as well as a motor which is mounted on the first support plate. The machine tool additionally comprises a telescopic shaft with a first shaft portion and a second shaft portion that can be displaced relative to said first shaft portion. The first shaft portion is coupled to a motor shaft of the motor, and the second shaft portion as mounted on the second support plate. The telescopic shaft is coupled to the output shaft by means of a gear mechanism.

15 Claims, 3 Drawing Sheets

(58) Field of Classification Search
CPC . B24B 41/002; B24B 41/005; B24B 27/0038; B24B 27/0007; B24B 27/0015; B24B 41/047; B24B 41/053
See application file for complete search history.

(56) References Cited

U.S. PATENT DOCUMENTS

| | | | |
|---|---|---|---|
| 2004/0259471 A1* | 12/2004 | Antenen | B25J 15/0019 451/5 |
| 2013/0102227 A1 | 4/2013 | Walsh et al. | |
| 2014/0005831 A1* | 1/2014 | Naderer | B25J 11/0065 700/258 |
| 2015/0183076 A1* | 7/2015 | Lange | B24B 5/24 451/11 |
| 2016/0176015 A1 | 6/2016 | Naderer | |

FOREIGN PATENT DOCUMENTS

| | | |
|---|---|---|
| JP | S60178556 A | 9/1985 |
| JP | S61260973 A | 11/1986 |
| JP | S62162322 A | 7/1987 |
| JP | 06-091581 | 4/1994 |
| JP | H07136970 A | 5/1995 |
| JP | 07-032286 | 6/1995 |
| WO | 2016145472 A1 | 9/2016 |

\* cited by examiner

MACHINE TOOL FOR ROBOT-ASSISTED SURFACE FINISHING

TECHNICAL FIELD

The present invention relates to a robot-driven machine tool for the robot-assisted machining of surfaces, for example a grinding machine or a polishing machine.

BACKGROUND

Grinding and polishing processes are playing an increasingly important role in the surface machining of workpieces. In automated, robot-assisted manufacturing industrial robots are used, by means of which, e.g. grinding processes can be automated.

In robot assisted grinding apparatuses a grinding machine with a rotating grinding tool (e.g. a grinding disc) is driven by a manipulator, for example an industrial robot. The so-called TCP (Tool Center Point) of the manipulator moves during the grinding process along a path (trajectory) that can be, e.g. programmed in advance by means of Teach-in. The predetermined path of the TCP defines the position and orientation of the TCP, and thus of the grinding machine, for every point in time. The robot control mechanism that controls the movement of the manipulator therefore generally includes a position control system (position regulation).

For surface machining processes such as milling, grinding, polishing, etc., controlling the position of the workpiece is generally not enough as the process force (the force between the workpiece and the tool) plays an important role in the machining results. The tool is therefore generally not rigidly connected to the TCP of the manipulator but instead via an elastic element which, in the simplest case, may be a spring. In order to adjust the process force, a regulation (closed-loop control) is needed in many cases. The elastic element used to implement the force control can be a separate linear actuator that is mechanically coupled between the TCP of the manipulator and the tool (e.g. between the TCP and a grinding machine on which a grinding disc is mounted). The linear actuator may be relatively small in comparison to the manipulator and is essentially used to control the process force while the manipulator moves the tool (together with the linear actuator) thereby controlling its position along the previously programmed trajectory.

One of the objectives of the present invention can be regarded as providing an improved machine tool such as, e.g. a grinding machine that is suitable for a robot assisted machining of surfaces.

SUMMARY

The aforementioned objective is achieved with the apparatus in accordance with claim 1. Various embodiments and further developments of the invention are the subject matter of the dependent claims.

An apparatus for a machine tool is described which, in accordance with one embodiment, has a first support plate and a second support plate; the first support plate is designed to be mounted on a manipulator and for the mounting of a motor. An output shaft on which a rotating tool can be attached is mounted on the second support plate. The machine tool further comprises a linear actuator that operates between the first support plate and the second support plate, as well as a telescopic shaft comprising a first shaft segment and a second shaft segment that can be moved relative to the first shaft segment. The first shaft segment is designed to be coupled to a motor shaft of the motor and the second shaft segment is mounted on the second support plate. The telescope shaft is coupled to the output shaft via a gear mechanism.

A machine tool for the robot assisted machining of surfaces is described. In accordance with one embodiment, the machine tool comprises a first support plate and a second support plate. The first support plate is designed to be mounted on a manipulator. An output shaft for attaching a rotating tool is mounted on the second support plate. The machine tool further comprises a linear actuator that operates between the first support plate and the second support plate, as well as a motor that is mounted on the first support plate. The machine tool further comprises a telescope shaft with a first shaft segment and a second shaft segment that is movable relative to the first shaft segment. The first shaft segment is coupled to a motor shaft of the motor and the second shaft segment is mounted on the second support plate. The telescope shaft is coupled to the output shaft via a gear mechanism.

BRIEF DESCRIPTION OF THE DRAWINGS

The invention is described in greater detail using the examples illustrated in the figures. The illustrations are not necessarily true to scale and the invention is not limited to the illustrated aspects. Instead importance is given to illustrating the underlying principles of the invention. The figures show.

DETAILED DESCRIPTION

Before various embodiments are described in detail, a general example of a robot assisted grinding apparatus will first be described. The embodiments described here, however, are not limited to grinding apparatuses. The apparatuses described here can be used for the robot-assisted performance of numerous other machining processes in which a rotating tool is employed, (e.g. any abrasive machining process such as, e.g. milling, grinding, polishing etc.).

Figure 1:
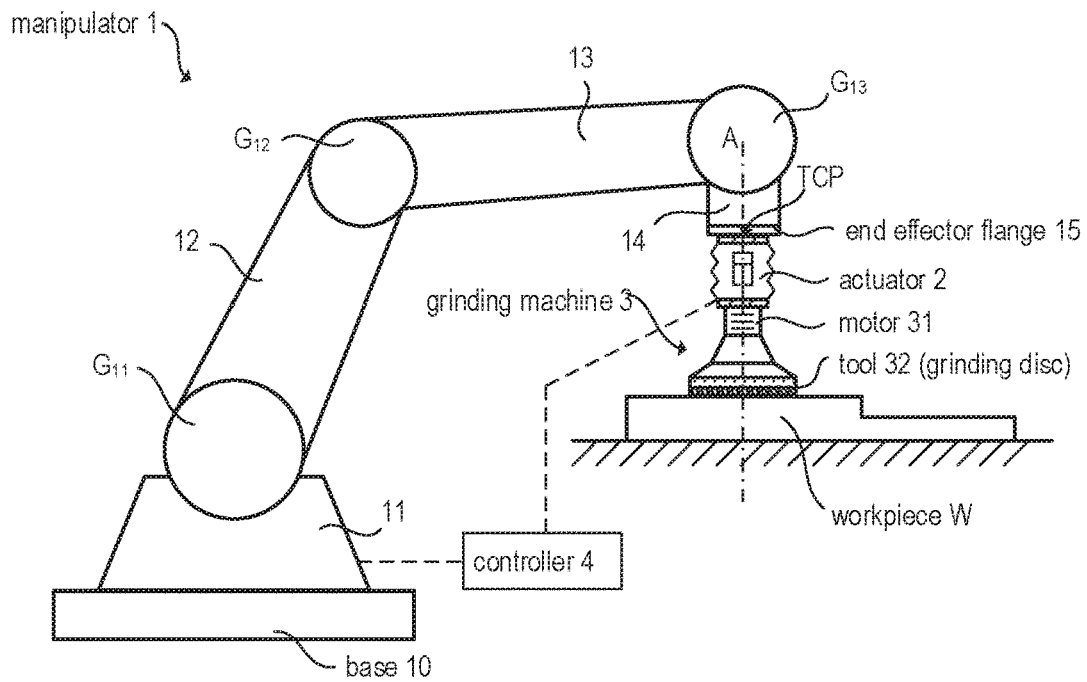
FIG. 1 is an exemplary schematic illustration of a robot assisted grinding apparatus with a grinding machine that is coupled to an industrial robot by means of a force-controlled linear actuator; the linear actuator effects a mechanical decoupling of the industrial robot and the grinding machine.

The example illustrated in FIG. 1 comprises a manipulator 1 (for example, an industrial robot) and a machine tool 3 (e.g. a grinding machine) that has a motor 31 and a rotating tool 32 (e.g. grinding disc). The grinding machine 3 is coupled (at the Tool Center Point TCP) to the end effector flange 15 of the manipulator 1 via a linear actuator 2. In the case of an industrial robot with six degrees of freedom, the manipulator can be constructed of four segments 11, 12, 13 and 14, each of which are connected via the joints $G_{11}$, $G_{12}$ and $G_{13}$. The first segment 11 is usually rigidly connected to the base 10 (which, however, need not necessarily be the case). The joint $G_{13}$ connects the segments 13 and 14. The joint $G_{13}$ can be biaxial and may allow for a rotation of the segment 14 (relative to the segment 13) around a horizontal axis of rotation (elevation angle) and a vertical axis of rotation (azimuth angle). The joint $G_{12}$ connects the segments 12 and 13 and allows for a swivel movement of the segment 13 relative to the position of the segment 12. The joint $G_{11}$ connects the segments 11 and 12. The joint $G_{11}$ can be biaxial and thus (similar to joint $G_{13}$) allow for a swivel movement in two directions. The TCP has a fixed position relative to segment 14, which generally comprises an additional swivel joint (not shown) that allows for a rotational movement around a longitudinal axis A of the segment 14 (depicted in FIG. 1 with a dash-dotted line). The manipulator 1 thus has a total of six degrees of freedom. For every axis of a joint an actuator is arranged that can effect a swivel movement around the respective joint axis. The actuators in the joints are controlled by a robot control mechanism 4 in accordance with a robot program. The TCP can be positioned arbitrarily (within certain limitations) and with any orientation of the axis A.

The manipulator 1 is usually position controlled, i.e. the robot controller 4 can determine the pose (position and orientation) of the TCP and can move it along a previously defined trajectory. When the actuator 2 comes to rest at an end stop, the pose of the TCP also defines the pose of the tool 32 (as well as that of the entire grinding machine 3). The actuator 2 serves to adjust the contact force $F_K$ (process force) between the tool 32 and the workpiece W to a desired value during the grinding process. Adjusting the process force directly by means of the manipulator 1 is generally too imprecise for grinding applications as quickly compensating force peaks (e.g. that occur when the grinding tool contacts the workpiece W) using common manipulators is practically impossible due to the high inertia of the segments 11 to 14 of the manipulator 1. For this reason the robot control mechanism is configured to control the pose (position and orientation) of the TCP, whereas controlling the contact force $F_K$ is carried out exclusively by the actuator 2 that is coupled between the grinding machine 3 and the manipulator 1. Due to the force control, the actuator 2 is capable of compensating deviations in the location and position of the workpiece W during the grinding process (in the effective direction of the actuator 2) while maintaining the desired process force $F_K$. Such deviations may be caused, e.g. by errors in the positioning of the workpiece or by inaccuracies in the positioning of the TCP (due to tolerances).

As mentioned above, during the grinding process the contact force $F_K$ between the tool 32 and the workpiece W can be adjusted with the aid of the (linear) actuator 2 and a force control unit (which can be implemented, for example, in the controller 4) such that the contact force $F_K$ between the grinding tool 32 and the workpiece W corresponds to a specifiable desired value. The contact force is a reaction to the actuator force $F_A$ with which the linear actuator 2 presses against the workpiece surface. If contact between the workpiece W and the tool 32 fails to occur, the actuator 2, due to the absence of the contact force $F_K$, comes to rest against an end stop (not shown in FIG. 1 or integrated in the actuator 2). The position control of the manipulator 1 (which may also be implemented in the controller 4) can function completely independently of the force control of the actuator 2. The actuator 2 is not responsible for the positioning of the grinding machine 3, but only for the adjustment and maintenance of the desired contact force $F_K$ during the grinding process and for detecting the contact between the tool 32 and the workpiece W. A contact can be detected e.g., when the deflection of the actuator from the end stop becomes smaller or when the change in the deflection of the actuator 2 becomes negative.

One problem that generally arises in robot assisted, automated systems in which the robot contacts an object (e.g. workpiece W) is determining the time point of contact and controlling the contact force. It is only possible to regulate the contact force after the robot has contacted the surface of the object. For this reason, in all known force-controlled systems, an impulse-type contact force first arises upon contact between the robot-mounted tool and the object surface. When this collision occurs, not only does the mass (i.e. the inertia forces and thus the kinetic energy) of the tool (see FIG. 1, grinding machine 3) and the actuator (see FIG. 1, actuator 2) have an effect, but also the mass and the kinetic energy of the entire manipulator including its drive. This mass essentially determines the impact energy (that is to be prevented).

In many cases, the resulting impulse-type contact force may not cause any problems, but in applications in which precision is important or in which very delicate workpieces have to be machined, it can be bothersome and undesirable. In other words, the actual contact force may exceed the desired contact force. It may also become necessary to re-adjust the position of the tool while machining the surface in order to maintain the desired contact force. In such a case it is static friction effects (the so-called "Stick-Slip Effect") that can cause such transient overshooting of the contact force during the machining process. Furthermore, in drives that employ gears, the meshing of the gears may produce sudden undesired jolts or vibrations. Both of these effects may result in quality problems during the handling or machining of objects.

The overshooting described above can be reduced by mechanically decoupling the machine tool (e.g. a grinding machine) from the manipulator 1. This decoupling can be achieved, e.g. by means of a spring. In the example illustrated in FIG. 1 the decoupling is achieved using the actuator 2. The actuator 2 may be a pneumatic actuator, e.g. a double-acting pneumatic cylinder, however other pneumatic actuators such as a bellows cylinder or an air muscle may also be used. As an alternative, (gearless) direct electric drives may also be considered. In the case of a pneumatic actuator, controlling the force can be carried out in an as such known manner using a control valve, a regulator (implemented in the controller 4) and a compressed air reservoir. The specific implementation are, however, not relevant for the further description and will therefore not be described here in detail. In the examples described here, the actuator 2 is substantially free of static friction in order to prevent the stick-slip effect or at least to reduce it to a minimum. "Substantially free of static friction" does not mean that the static friction is equal to zero but that it is negligibly small in comparison to the actuator force. When the machine tool and the manipulator are completely decoupled from each other, the inertia forces of the manipulator no longer affect the contacted surface.

Despite the aforementioned mechanical decoupling of the manipulator and the tool, inertia forces of the machine tool remain that may still affect the surface of the contacted workpiece. When strong processing forces are present (e.g. grinding forces between the grinding disc and the workpiece), the machine tool generally requires a powerful motor (e.g. an electric motor) that has a correspondingly high mass. The actuator 2 must also be adapted for the weight of the machine tool (including the motor) as the actuator must generally (at least partially) compensate the weight force of the machine tool when regulating the force.

Figure 2:
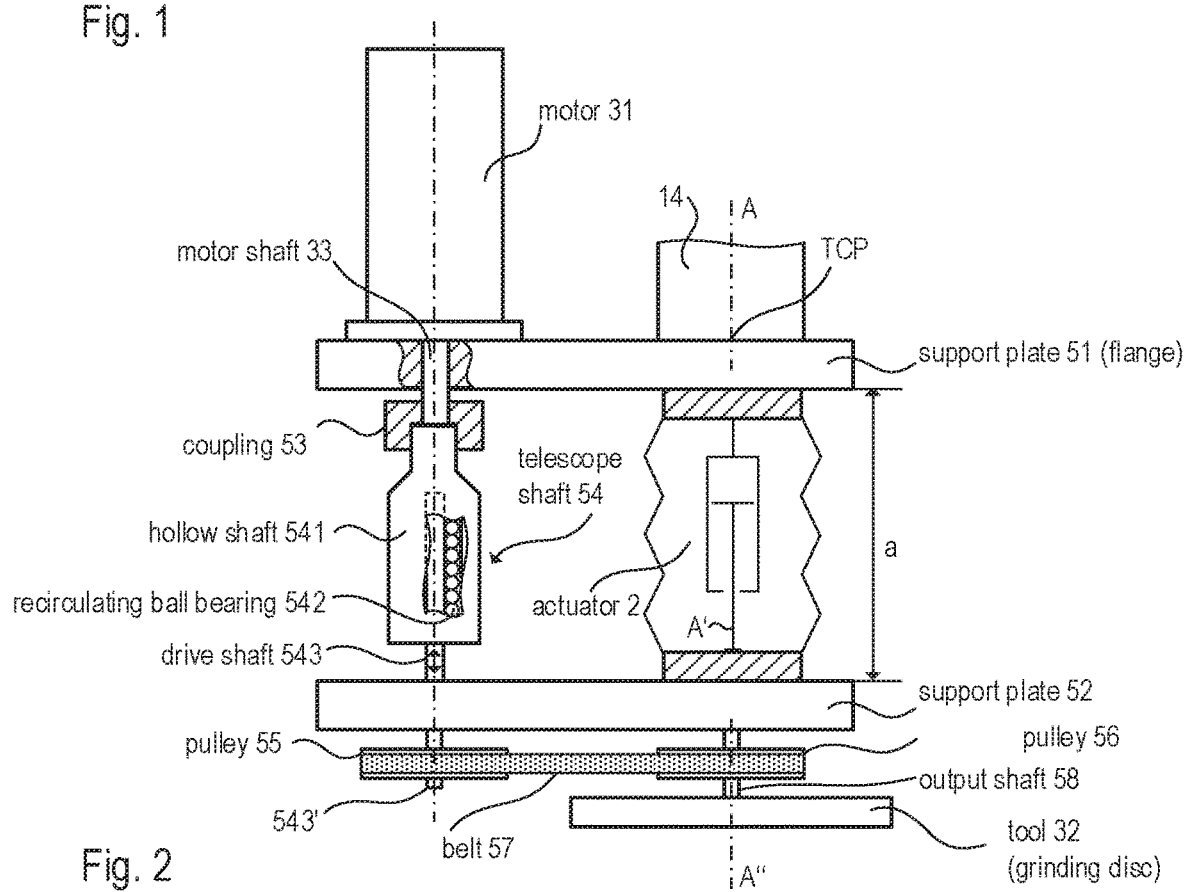
FIG. 2 illustrates an exemplary embodiment of a machine tool with an integrated linear actuator for the mechanical decoupling of a drive side from a tool side of the machine tool.

In accordance with the preceding example of FIG. 1, the actuator 2 is arranged between the manipulator 1 and the machine tool 3. FIG. 2 shows an example of a machine tool 3 (e.g. a grinding machine) with an integrated actuator 2. Integrating the actuator into the machine tool makes it possible to mechanically decouple a drive side, on which a (comparatively heavy) motor 31 is arranged, from a tool side on which the (comparatively light) tool 32 (e.g. a grinding disc) is arranged. When the machine tool 3 of FIG. 2 is mounted at its drive side on an end effector flange (cf. FIG. 1, No. 15) of a manipulator, the weight of all the components (incl. the weight of the motor 31) on the drive side of the machine tool 3 is absorbed by the manipulator and only the comparatively small mass of the components on the tool side must be moved by the integrated actuator 2.

In accordance with the example illustrated in FIG. 2, the machine tool 3 comprises a first support plate 51 and a second support plate 52. The first support plate 51 is designed to be able to be mounted on a manipulator, for example on the end effector flange 15 of the manipulator 1 of FIG. 1. An output shaft 58 is mounted on the second support plate 52. When in operation, a rotatable tool 32, for example a grinding disc, can be mounted on the output shaft 58. A linear actuator 2 is arranged between the two support plates 51 and 52. The linear actuator 2 operates between the two support plates 51 and 52 such that the distance a between the two support plates 51 and 52 depends on the deflection of the linear actuator 2. In normal operation, the linear actuator 2 is operated force-controlled so that the actuator force takes effect between the two support plates 51 and 52. When the tool 32 is not contacting a surface, the linear actuator 2 presses against an end stop (not shown) with a desired actuator force. The actuator 2 may be a pneumatic linear actuator and include, for example, a double-acting pneumatic cylinder. Other pneumatic actuators, however, may also be used such as, e.g. bellows cylinders and air muscles. As an alternative, direct (gearless) electric drives may also be considered.

A motor 31 (e.g. an electric motor) for driving the tool 32 is mounted on the first support plate 51. In accordance with the present example, the motor 31 may be flange mounted on the first support plate 51, in which case the motor shaft 33 extends through the first support plate 51. The distance between the two support plates 51 and 52 is "bridged" by a telescopic shaft 54. The telescopic shaft 54 comprises two shaft segments (hollow shaft/sheath 541, drive shaft 543) that can be moved relative to each other. A first segment of the two shaft segments is coupled to the motor shaft 33 of motor 31 (e.g. by means of a shaft coupling) and a second segment of the two shaft segments is mounted on the second support plate 52, for example by means of roller bearings. Alternatively to roller bearings, slide bearings may also be used.

The aforementioned output shaft 58 is coupled to the telescope shaft 54 via a transmission, enabling the motor shaft 33 to drive the telescope shaft 54 and the telescope shaft to drive the output shaft 58 (via the transmission). In accordance with the embodiment described here, the transmission is a belt drive. A first pulley 55 is coupled to the second shaft segment (which can be moved relative to the first support plate) of the telescope shaft 54 and a second pulley 56 is coupled to the output shaft 58. Both pulleys 55 and 56 are connected via a belt (e.g. a V-belt or a toothed belt), enabling the output shaft 58, and thus the tool 32 mounted upon it (e.g. a grinding disc) to be driven via the telescope shaft and the belt drive. As an alternative to the belt drive, a gear transmission or any other kind of transmission arranged on the second support plate 52 may also be used.

The drive shaft 543 (second shaft segment) can be moved along the axis of rotation of the telescope shaft 54 relative to the hollow shaft 541 (first shaft segment). In the embodiment illustrated in FIG. 2, the second shaft segment of the telescope shaft 54 extends through the second support plate 52 and the second shaft segment of the telescope shaft 54 can be mounted on the second support plate 52 using roller bearings (e.g. ball bearings). The first shaft segment of the telescope shaft 54 may be firmly connected to the motor shaft 33 of the motor 31 by means of a (e.g. rigid) shaft coupling 53. When, as in the present example, the motor 31 is flange mounted on the first support plate 51 such that the motor shaft 33 extends through the support plate 51, the shaft coupling 53 will be positioned between the two support plates 51 and 52.

In order that the linear actuator 2 can effect on the second support plate 52 without impediment, it may be advisable that the linear movement between the two shaft segments of the telescopic shaft 54 along the axis of rotation of the telescope shaft 54 be carried out with as little retroactive effect on the actuator as possible. To this end, the first shaft segment and the second shaft segment of the telescope shaft 54 may be movably mounted on each other by means of linear bearings 542. In order that the linear bearing 542 exhibits a (negligibly) small degree of static friction, it may be implemented as linear ball bearing having an axial ball recirculation (recirculating ball bearings).

In the present example the linear actuator 2 is effective along a longitudinal axis A'. This axis A' may be coaxial to an axis of rotation A" of the output shaft 58. Further, this longitudinal axis A' of the linear actuator 2 may also be aligned with the TCP of the manipulator 1 so that the TCP and the longitudinal axis A' (and also the axis of rotation A") are aligned. In this case the linear actuator 2 operates when mounted on the end effector flange of a manipulator in one line between the TCP of the manipulator and the axis of rotation A" of the output shaft 58 on which the tool 32 is mounted, reducing the stress caused by the bending moment of the linear actuator and the telescope shaft.

Figure 3:
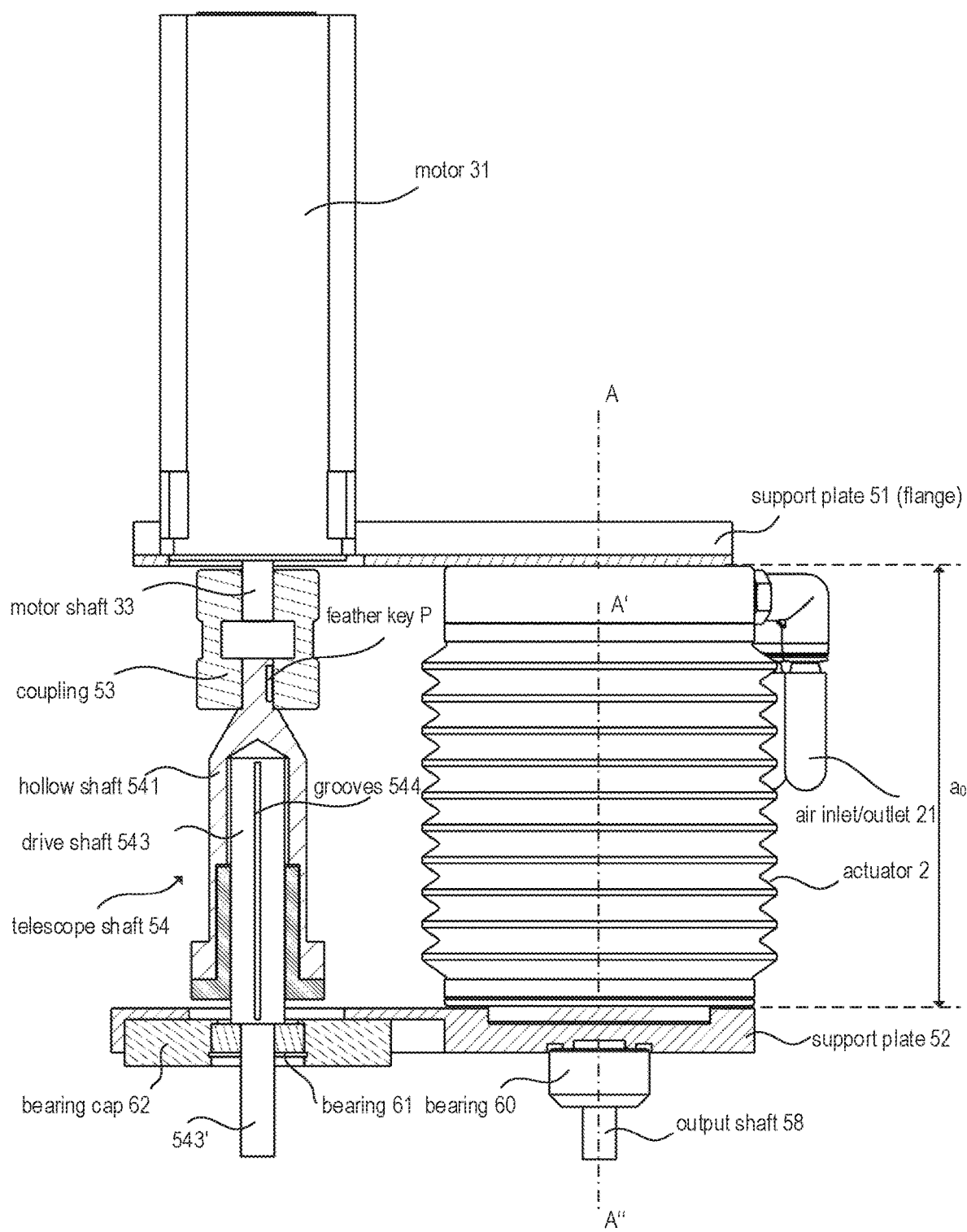
FIG. 3 illustrates a further embodiment of a machine tool with a mechanically decoupled drive side and a tool side.

FIG. 3 illustrates a further embodiment of a machine tool, in which the drive side (support plate 51, motor 31) and the tool side (second support plate 52, output shaft 58, transmission) are mechanically decoupled by means of a linear actuator 2 and a telescope shaft 54. This decoupling decouples the dynamics of the components on the drive side, including that of the manipulator, from the dynamics of the tool side. The embodiment of FIG. 3 is constructed essentially the same as the previous example of FIG. 2, wherein the belt transmission has been omitted for reasons of clarity. In FIG. 3, however, the bearings 61 on which the telescope shaft 54 is mounted on the second support plate 52 are shown. Furthermore, the connection between the telescope shaft 54 and the shaft coupling 53 is illustrated in greater detail (see feather key P). The balls of the linear ball bearings are not shown, but the grooves 544, through which the balls circulate, are.

Figure 4:
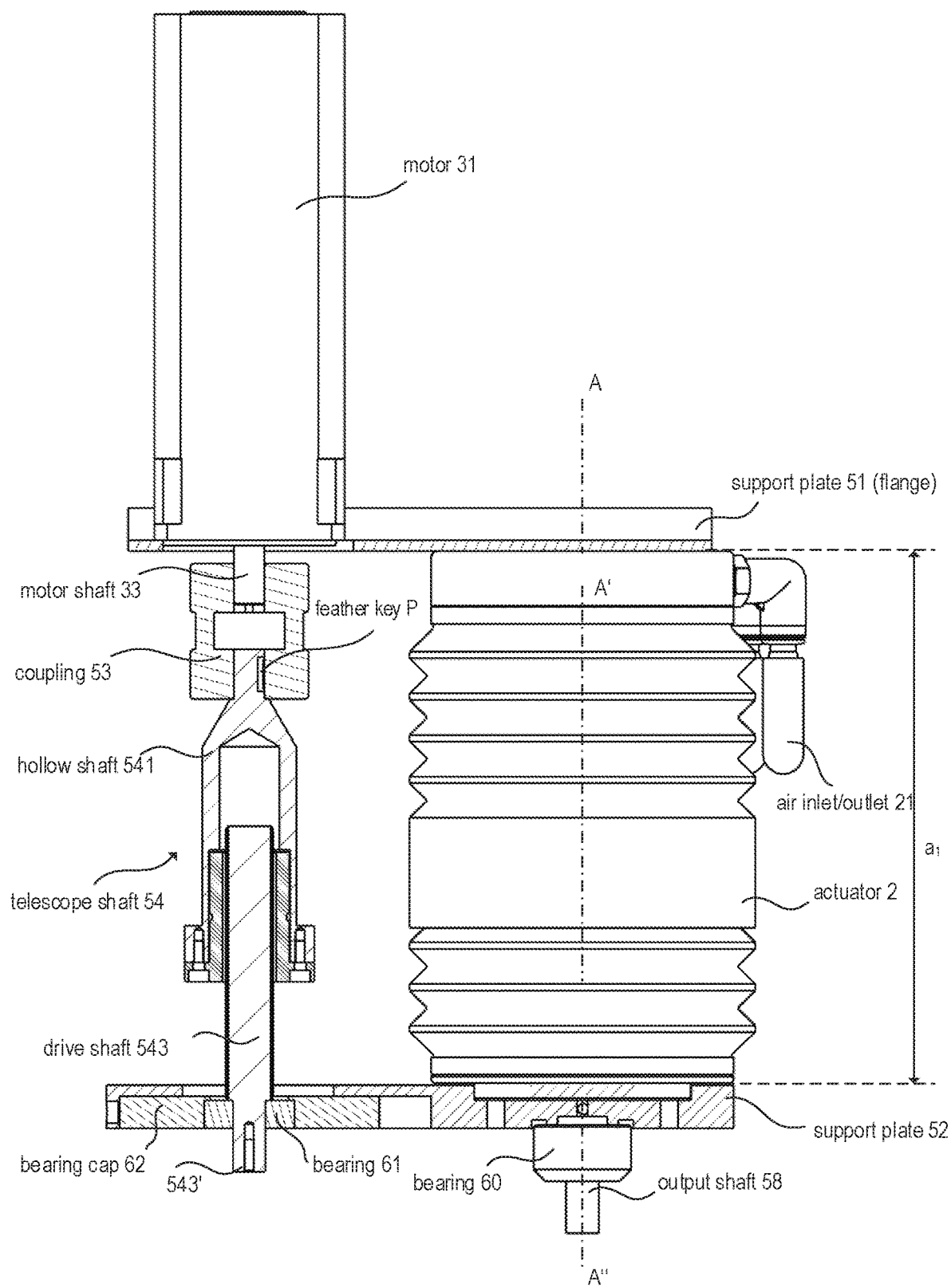
FIG. 4 illustrates the example of FIG. 3, however with a greater deflection of the linear actuator than that of FIG. 3.

In the example illustrated in FIG. 3 the linear actuator 2 is shown at a minimal deflection (the distance $a_0$ between the support plates 51 and 52 is at a minimum). FIG. 4 shows the same embodiment as in FIG. 3, in which, however, the deflection $a_1$ of the linear actuator 2 is larger than in FIG. 3.

Apart from that the example of FIG. 4 is identical to the previous example of FIG. 3, so the corresponding description is not repeated.

The embodiments described here were implemented with a specific selection of components (machine elements) chosen from among many possible ones. Here it should be pointed out that many of the components used to realize the embodiments illustrated herein may be substituted by other components that essentially fulfill the same or similar functions. For example, instead of the roller bearings used in accordance with the embodiment of FIG. 3, slide bearings may be used at one or another position, which may be advisable, for example, at higher speeds of rotation. Further, the belt transmission can be replaced by any other kind of transmission, for example by a gear transmission. Although a pneumatic linear actuator may offer advantages in many applications, in certain applications a different actuator (e.g. an electric actuator) may be used as well. The shaft connections also need not necessarily be realized as shown in the embodiments in accordance with FIGS. 2 and 3. If the motor shaft 33 and the telescope shaft 54 are not coaxial, instead of the shaft coupling 53, a connection shaft with Cardan joints can also be employed. For these reasons, the present invention is not limited to the illustrated embodiments but rather to the following claims and their legitimate equivalents.

The invention claimed is:

1. An apparatus for a machine tool for robot assisted machining of surfaces, the apparatus comprising:
   a first support plate configured to be mounted on a manipulator and for mounting of a motor;
   a second support plate configured to support a rotatable tool;
   a linear actuator configured to operate between the first support plate and the second support plate; and
   a telescope shaft with a first segment and a second segment that is moveable relative to the first segment in an axial direction,
   wherein the first segment is configured to be coupled to a motor shaft of the motor and the second segment is mounted on the second support plate.

2. The apparatus of claim 1, further comprising:
   an output shaft mounted on the second support plate and configured to receive the rotatable tool; and
   a transmission that couples the telescope shaft to the output shaft.

3. The apparatus of claim 2, wherein the transmission is a belt transmission or a gear transmission.

4. The apparatus of claim 2, wherein the linear actuator operates along a longitudinal axis that lies coaxially to an axis of rotation of the output shaft.

5. The apparatus of claim 2, wherein the first support plate is mounted on the manipulator such that a tool center point of the manipulator is aligned with an axis of rotation of the output shaft.

6. The apparatus of claim 2, further comprising:
   a first pulley coupled to the second segment of the telescope shaft; and
   a second pulley coupled to the output shaft,
   wherein the second pulley is coupled to the first pulley via a belt.

7. The apparatus of claim 1, wherein the second segment of the telescope shaft extends through the second support plate.

8. The apparatus of claim 1, wherein the second segment of the telescope shaft is mounted on the second support plate by ball bearings or slide bearings.

9. The apparatus of claim 1, wherein the motor shaft and the first segment of the telescope shaft are connected to each other via a shaft coupling.

10. The apparatus of claim 1, wherein the first segment and the second segment of the telescope shaft are movably mounted on each other by linear bearings.

11. The apparatus of claim 10, wherein the linear bearings comprise linear ball bearings with an axial ball circulation.

12. The apparatus of claim 1, wherein the second segment of the telescope shaft is mounted on the second support plate using a bearing.

13. The apparatus of claim 1, wherein the first segment of the telescope shaft is mounted on the first support plate using a bearing.

14. A machine tool for robot assisted machining of surfaces, the machine tool comprising:
   a first support plate configured to be mounted on a manipulator;
   a second support plate configured to support a rotatable tool;
   a linear actuator configured to operate between the first support plate and the second support plate;
   a telescope shaft with a first segment and a second segment that is moveable relative to the first segment in an axial direction, the second segment being mounted on the second support plate; and
   a motor mounted on the first support plate and having a motor shaft coupled to the first segment of the telescope shaft.

15. An apparatus, comprising:
   a manipulator with an end effector flange;
   a first support plate mounted on the end effector flange of the manipulator;
   a second support plate configured to support a rotatable tool;
   a linear actuator configured to operate between the first support plate and the second support plate;
   a telescope shaft with a first segment and a second segment that is moveable relative to the first segment in an axial direction, the second segment being mounted on the second support plate; and
   a motor mounted on the first support plate and having a motor shaft coupled to the first segment of the telescope shaft.

* * * * *